United States Patent [19]
Chiang

[11] Patent Number: 6,052,119
[45] Date of Patent: Apr. 18, 2000

[54] IMAGE DISPLAYING DEVICE WITH TIME CONTROL FUNCTION

[75] Inventor: Tzu-Pang Chiang, Taoyuan, Taiwan

[73] Assignee: Acer Peripherals. Inc., Taoyuan, Taiwan

[21] Appl. No.: 08/951,915

[22] Filed: Oct. 16, 1997

[51] Int. Cl.⁷ ..................................................... G09G 5/00
[52] U.S. Cl. ........................... 345/212; 348/5.5; 348/818
[58] Field of Search .................................. 345/112, 204, 345/211, 212; 340/825.25; 380/7; 348/5.5, 569, 552, 563, 460, 818; 395/750.03, 750.06

[56] References Cited

U.S. PATENT DOCUMENTS 5,153,580  10/1992  Pollack ............................... 340/825.25
5,231,661   7/1993  Harnum et al. ............................. 380/7

*Primary Examiner*—Bipin Shalwala
*Assistant Examiner*—Kent Chang
*Attorney, Agent, or Firm*—Winston Hsu

[57] ABSTRACT

The present invention relates to an image displaying device which can control the usage of the image displaying device according to some predetermined time-related events. The image displaying device comprises a screen for displaying an image frame, an image display circuit for displaying image signals on the screen to form the image frame, a clock circuit for generating clock signals containing time of day information in it, a control circuit for controlling usage of the image display circuit according to the clock signals, and an on-screen display circuit electrically connected between the control circuit and the image display circuit for displaying a warning message on the screen through the image display circuit to prevent the image display circuit from normally displaying the image signals on the screen. When the control circuit detects one of the time-related events, the control circuit will control the on-screen display circuit to display the warning message on the screen to prevent the image display circuit from displaying the image signals on the screen in a normal manner.

7 Claims, 5 Drawing Sheets

IMAGE DISPLAYING DEVICE WITH TIME CONTROL FUNCTION

BACKGROUND OF THE INVENTION

1. Field of the Invention

The present invention relates to an image displaying device, and more particularly, to an image displaying device with time control function.

2. Description of the Prior Art

Most personal computers currently available in the market have very limited capability in restricting usage of the computers. For example, in an office environment, a user may work in front of a computer and watch the computer monitor for too long which may hurt his/her eyes. A child may play computer games or access Internet for too long and forget to sleep. Some publicly available software such as Ergo Sentry (www.magnitude.com) or ErgoBreak for office use (www.vanity.net) provide some limited time control function. For example, if a computer installed with such software is used longer than a predetermined time interval, the software will display a warning message on the screen and suggest the user to take a break. However, it is usually very easy for a user to get around or stop executing the software because they are stored in the hard disk of the computer and can be easily initiated or terminated. Such easiness renders it useless in controlling usage of the computer. Parents may hope that a computer system can be set to automatically restrict its usage when a predetermined time-related event is detected so that their kids will not indulge in the computer for too long, and such restriction should not easily be bypassed by general computer users.

SUMMARY OF THE INVENTION

It is therefore a primary objective of the present invention to provide an image displaying device which provides time control function to restrict usage of a computer connected to the device and which can not easily be bypassed by general computer users.

Briefly, in a preferred embodiment, the present invention provides an image displaying device comprising a screen for displaying an image frame; an image display circuit for displaying image signals on the screen to form the image frame; a clock circuit for generating clock signals containing time of day information in it; a control circuit for controlling usage of the image display circuit according to the clock signals; and an on-screen display circuit electrically connected between the control circuit and the image display circuit, for displaying a warning message on the screen through the image display circuit to prevent the image display circuit from normally displaying the image signals on the screen. When the control circuit detects one of the time-related events, the control circuit will control the on-screen display circuit to display the warning message on the screen to prevent the image display circuit from displaying the image signals on the screen in a normal manner.

It is an advantage of the present invention that it provides an image displaying device with time control function to restrict usage of a computer connected to the device. Since most image displaying devices do not allow general users to access their internal mechanisms and commonly available computer or software skills are useless in breaking into the control circuit of the monitor, such time control function can not be easily bypassed by general users.

This and other objectives of the present invention will no doubt become obvious to those of ordinary skill in the art after having read the following detailed description of the preferred embodiment which is illustrated in the various drawings and figures.

DETAILED DESCRIPTION OF THE PREFERRED EMBODIMENT

Figures 1, 3:
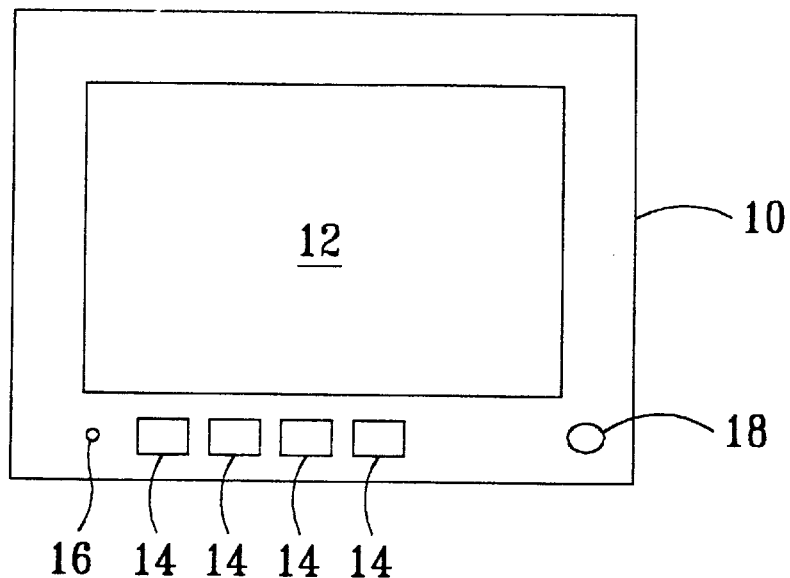
FIG. 1 is a perspective view of an image displaying device according to the present invention.
FIG. 3 shows the content of the data table shown in FIG. 2.

Please refer to FIG. 1. FIG. 1 is a perspective view of an image displaying device 10 according to the present invention. The image displaying device 10 comprises a screen 12 for displaying an image frame, four traditional monitor digital input keys 14 (+,−,P,S) for generating input signals, a mode key 16 for converting the operation mode of the device 10, and an on/off switch 18 for turning on or off of the device 10. The device 10 comprises two operation modes: display control mode and input mode. These two modes can be switched by using the mode key 16. When device 10 is in the display control mode, the four input keys 14 are used traditionally for controlling brightness, contrast, vertical size, or other features related to the operation of the screen 12. And when device 10 is in the input mode, the four input keys 14 are used for keying in passwords and modifying data of time-related events stored in the device 10.

Figure 2:
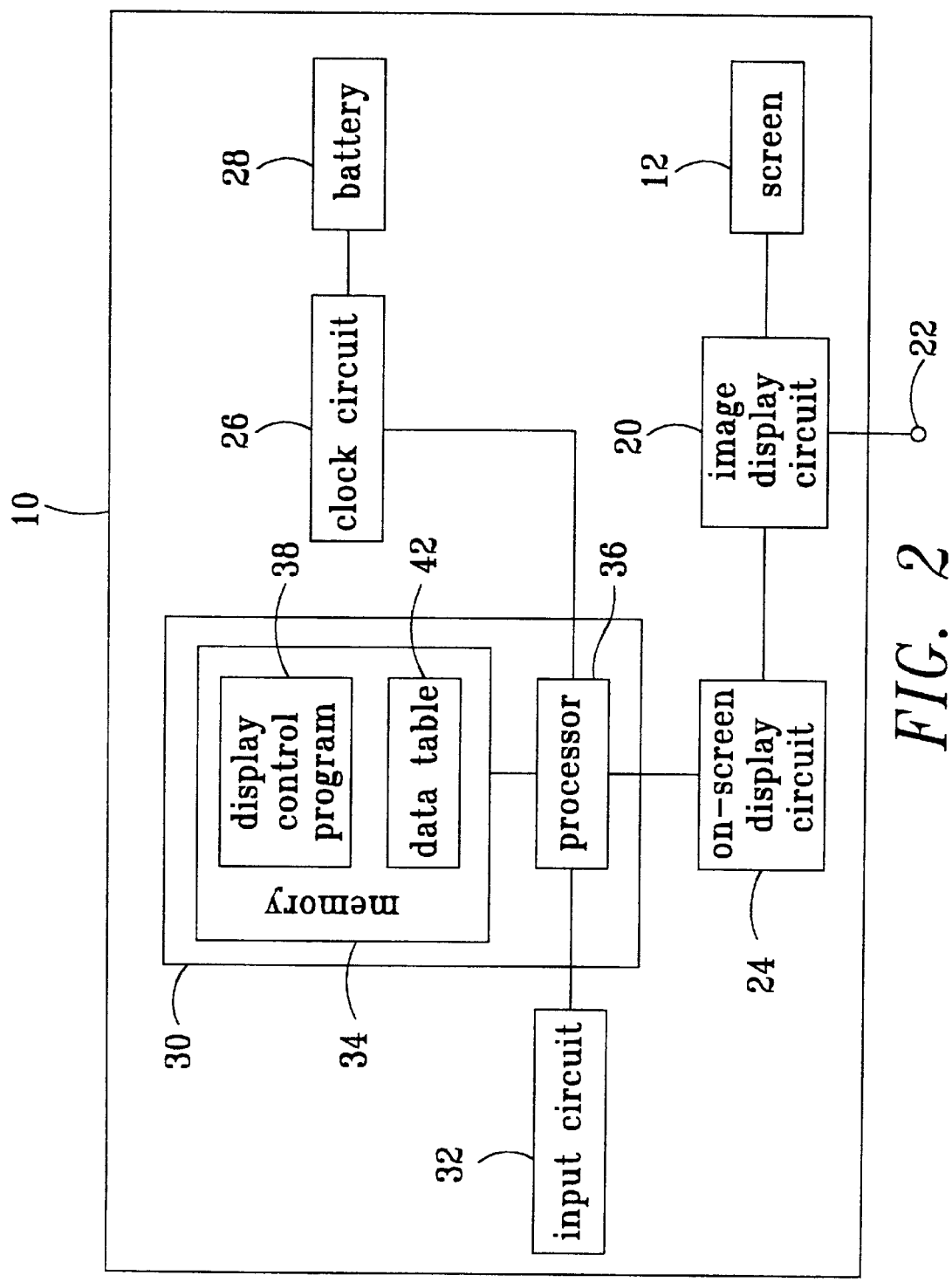
FIG. 2 is a function block diagram of the image displaying device shown in FIG. 1.

Please refer to FIG. 2. FIG. 2 is a function block diagram of the image displaying device 10 shown in FIG. 1. The image displaying device 10 comprises a screen 12 for displaying an image frame, an image display circuit 20 for displaying image signals inputted from an input port 22 over the screen 12 to form the image frame, an on-screen display circuit 24 electrically connected to the image display circuit 20 for displaying a warning message over the screen 12 to restrict the image display circuit 20 from normally displaying the image signals on the screen 12, a clock circuit 26 for generating clock signals which contains time of day information in it, a battery 28 electrically connected to the clock circuit 26 for supplying electric power to the clock circuit 26 when the image displaying device 10 is turned off, a control circuit 30 for controlling usage of the image display circuit 20 according to the clock signals generated by the clock circuit 26, and an input circuit 32 electrically connected to the control circuit 30 for generating input signals according to user inputs. The input circuit 32 comprises the mode key 16 and four input keys 14 shown in FIG. 1, and the input signals generated by these keys will be passed to the control circuit 30. The control circuit 30 comprises a memory 34 for storing a display control program 38, a processor 36 for executing the display control program 38, and a data table 42 for keeping passwords and data related to some time-related events set by a user of the device 10.

Please refer to FIG. 3. FIG. 3 shows the content of the data table 42 shown in FIG. 2. The data table 42 comprises a flag 48, a first password 44 for modifying flag 48, data 50, 52, 54, 56 of three time-related events, and a second password 46 for modifying the data of the three time-related events and the two passwords.

The three time-related events are:

(1) using device 10 not within a predetermined time schedule which is represented by data 50 and 52;

(2) using device 10 continuously more than a predetermined time interval which is represented by datum 54; and (3) using device 10 more than a predetermined accumulative time interval within a day which is represented by datum 56.

Data 50 and 52 of the first time-related event present two time intervals 16:00–18:00 and 20:00–22:30 within a day over which the usage of the device 10 is allowed. Datum 54 of the second time-related event shows that one-time continuous usage of the device 10 should not be more than 60 minutes. And datum 56 of the third time-related event shows that accumulative usage time of the device 10 within a day should not exceed 120 minutes.

Figure 4:
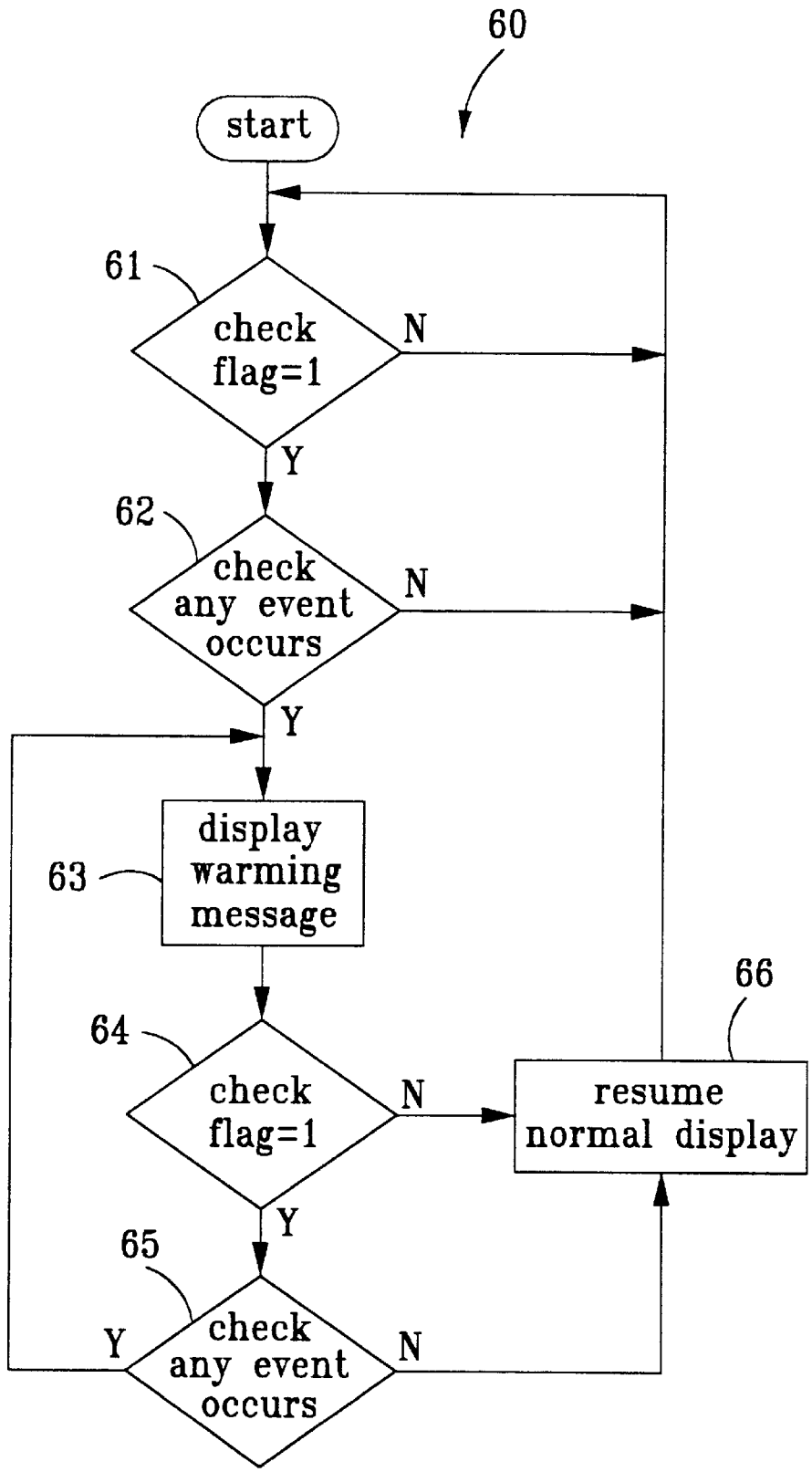
FIG. 4 is a procedure used by the display control program shown in FIG. 2 in display control mode.

Please refer to FIG. 4. FIG. 4 shows a procedure 60 used by the display control program 38 shown in FIG. 2 when the device 10 is in the display control mode.

Procedure 60 comprises the following steps:

step 61 check if the flag 48 is equal to 1; if not, periodically check again;

step 62 check if any of the three time-related events occurs according to data 50, 52, 54, and 56 of the three time-related events shown in FIG. 3; if not, go to step 61;

step 63 initiate the on-screen display circuit 24 to display a warning message over the screen 12 for restricting the image display circuit 20 from displaying the image signals inputted by the input port 22 on the screen 12 in a normal manner;

step 64 check if the flag 48 is equal to 1; if not, go to step 66;

step 65 check if any of the three time-related events still exists; if yes, go to step 63;

step 66 control the on-screen display circuit 24 to stop displaying the warning message over the screen 12 so that the image display circuit 20 can display the image signals inputted from the input port 22 on the screen 12 in a normal manner; go to step 61.

The status of the flag 48 will determine whether the image control program 38 will keep on checking the three time-related events and control the usage of the device 10 according to the checking result. When the flag 48 is set to 1, the display control program 38 will continue checking the three time-related events mentioned above. If the flag 48 is set to 0, the display control program 38 will stop checking immediately. The flag 48 can be changed when the device 10 is switched to the input mode by using the mode key 16.

When any of the time-related events happens, the display control program 38 will initiate the on-screen display circuit 24 to display a warning message over the screen 12 for restricting the image display circuit 20 from normally displaying the image signals inputted from the input port 22 on the screen 12, and this will continue until the time-related event is terminated or the flag 48 is set to 0.

When any of the time-related events occurs, the user can switch the device 10 into the input mode by using the mode key 16 shown in FIG. 1 and input the first password 44 to set the flag 48 to 0, or the user can input the second password 46 and modify data 50, 52, 54, and 56 of the three time-related events to resume normal display of the image display circuit 20 over the screen 12.

Figure 5:
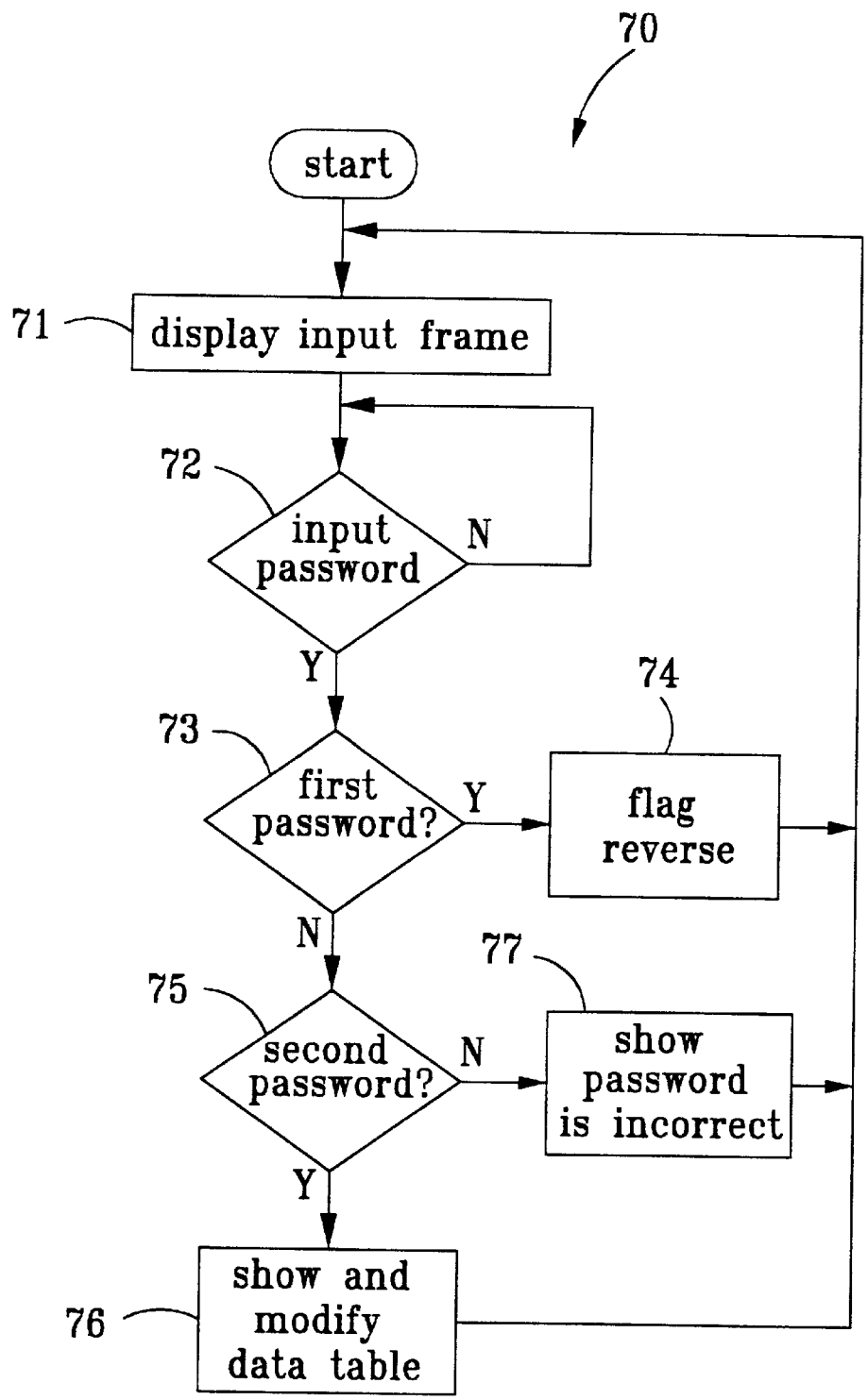
FIG. 5 is a procedure used by the display control program shown in FIG. 2 in input mode.
Figure 6:
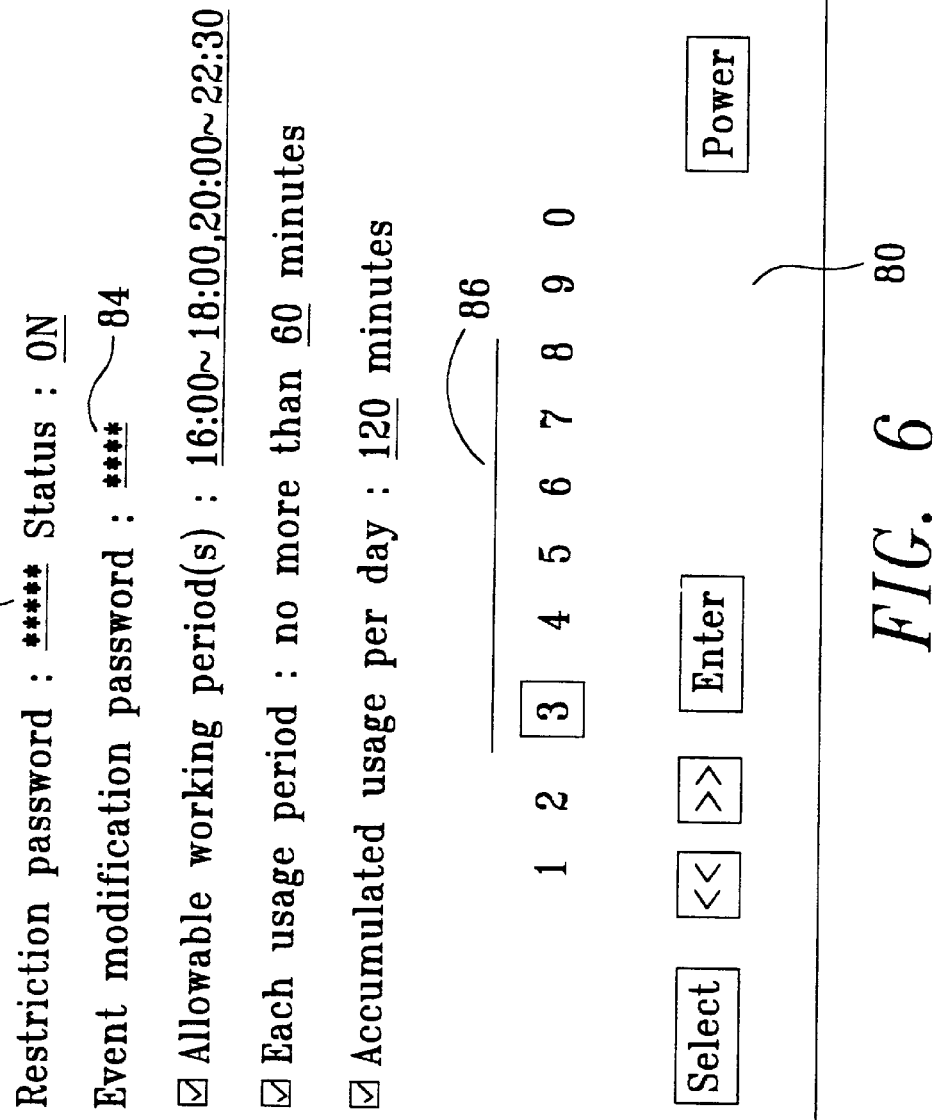
FIG. 6 is an input frame displayed in the procedure shown in FIG. 5.

Please refer to FIGS. 5 and 6. FIG. 5 shows a procedure 70 used by the display control program 38 shown in FIG. 2 when the device 10 is in the input mode. And FIG. 6 is an input frame 80 displayed in procedure 70. Procedure 70 comprises the following steps:

step 71 display the input frame 80 and request the user to input a password in field 82 or 84;

step 72 check if the password has been inputted; if not, check again;

step 73 check if the password entered in field 82 is the first password 44; if not, go to step 75;

step 74 reverse the setting of the flag 48 and show the modified result on frame 80; go to step 71;

step 75 check if the password entered in field 84 is the second password 46; if not, go to step 77;

step 76 display the content of the data table 42 on frame 80 and allow the user to modify the whole data table 42 through various related fields; go to step 71;

step 77 display an "incorrect password" message in field 86 of the frame 80, and go to step 71.

When the user finishes the procedure 70, the device 10 can be switched to the display control mode by pushing the mode key 16 shown in FIG. 1, and the display control program 38 will resume the execution of the procedure 60 shown in FIG. 4.

Since the warning message displayed by the display control program 38 is to prevent the user from keeping on using the computer connected to the displaying device 10, it is necessary that the warning message be large enough to cover most or all of the monitor screen. However, in order to avoid losing data during such inaccessible period of displaying the warning message, the display control program 38 can use the on-screen display circuit 24 to display an alarming message for a period of time, e.g. three minutes, before displaying the warning message in step 63. The alarming message can advise the user to terminate his/her job immediately to avoid losing data.

To implement the "eye-protection" function, the warning message should be periodically displayed on the screen. For example, after an hour of continuous usage of the image displaying device 10, the warning message is displayed for only 3 minutes, and then the normal display will be automatically resumed. If the image display device 10 is powered off, then the clock circuit 26 is powered by the battery 28, and it won't reset the 3 minute inaccessible period of displaying warning message.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image displaying device comprising:

a screen for displaying an image frame;

an image display circuit for displaying image signals on the screen to form the image frame;

a clock circuit for generating clock signals indicating a continuous usage time of the image display circuit; and a control circuit for controlling the image display circuit according to the clock signals;

wherein when the control circuit detects a predetermined time-related event regarding continuous usage of the image display circuit, the control circuit will restrict the image display circuit from displaying the image signals on the screen in a normal manner for a predetermined time interval, and then instruct the image display circuit to resume displaying the image signals afterwards.

2. The image displaying device of claim 1 further comprising a battery electrically connected to the clock circuit for supplying electric power to the clock circuit when the image displaying device is turned off.

3. The image displaying device of claim 1 wherein the control circuit comprises:

a memory for storing a display control program and data related to the time-related event; and a processor for executing the display-control program; wherein when the display control program detects the time-related event according to the data of the time-related event, the display control program will restrict the image display circuit from displaying the image signals on the screen in a normal manner.

4. The image displaying device of claim 1 further comprising an on-screen display circuit electrically connected between the control circuit and the image display circuit, for displaying a warning message over the screen through the image display circuit to prevent the image display circuit from normally displaying the image signals on the screen wherein when the control circuit detects the time-related event, the control circuit will control the on-screen display circuit to display the warning message over the screen to prevent the image display circuit from displaying the image signals on the screen in a normal manner.

5. The image displaying device of claim 4 wherein the control circuit comprises:

a memory for storing a display control program and data of the time-related event; and a processor for executing the display control program; wherein when the display control program detects the time-related event according to the data of the time-related event, the display control program will control the on-screen display circuit to display the warning message over the screen to prevent the image display circuit from displaying the image signals on the screen in a normal manner.

6. The image displaying device of claim 5 wherein the control circuit further comprises an input circuit for generating input signals according to user inputs, and the memory further comprises a password stored in it wherein when the display control program detects the password over the input signals generated by the input circuit, the display control program will control the on-screen display circuit to display an image frame for modifying the password stored in the memory or the data of the time-related event.

7. The image displaying device of claim 5 wherein the control circuit further comprises an input circuit for generating input signals according to user inputs, and the memory further comprises a password stored in it wherein when the display control program detects the password over the input signals generated by the input circuit, the display control program will stop detecting the time-related event and also stop using the on-screen display circuit to interfere with the image display circuit.

* * * * *